(No Model.)

O. B. MARTIN.
BELT SHIFTER.

No. 449,548. Patented Mar. 31, 1891.

Witnesses.
H. R. Edelen.
Henry W. Johnson

Inventor
Orien B. Martin
By Osborne & Co.
Att'ys

UNITED STATES PATENT OFFICE.

ORIEN B. MARTIN, OF AKRON, ASSIGNOR, BY DIRECT AND MESNE ASSIGNMENTS, OF ONE-HALF TO THOMAS HALE, OF MOGADORE, OHIO.

BELT-SHIFTER.

SPECIFICATION forming part of Letters Patent No. 449,548, dated March 31, 1891.

Application filed November 21, 1889. Renewed March 7, 1891. Serial No. 384,092. (No model.)

*To all whom it may concern:*

Be it known that I, ORIEN B. MARTIN, a citizen of the United States, residing at Akron, in the county of Summit and State of Ohio, have invented certain new and useful Improvements in Belt-Shifters, of which the following is a specification, reference being had therein to the accompanying drawings.

This invention relates to certain new and useful improvements in the construction of belt-shifters.

The invention has for its object the construction and application of a loose pulley whereby the driving-belt may be readily shifted upon or off of the driving-pulley; that will positively prevent the accidental slipping of the belt upon the fast pulley while the belt is resting upon the loose pulley; that is adapted to be brought into frictional contact with the fast pulley at such times as it is desired to shift the belt; that will leave the belt loose when not in use, so as to allow it to contract and also save unnecessary wear of the belt, and that will obviate the dangers attendant upon the use of the ordinary loose pulley as now generally employed.

The invention consists in the peculiar construction of the loose pulley, in the means employed for imparting motion to such pulley, and in the combination and arrangement of the parts, all as more fully hereinafter set forth and claimed.

Figure 1:
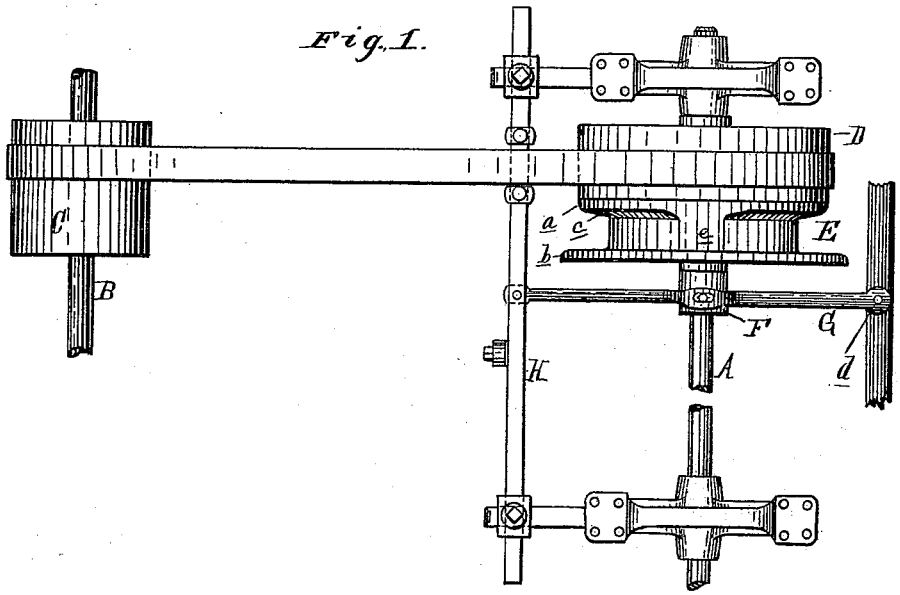
Figure 2:
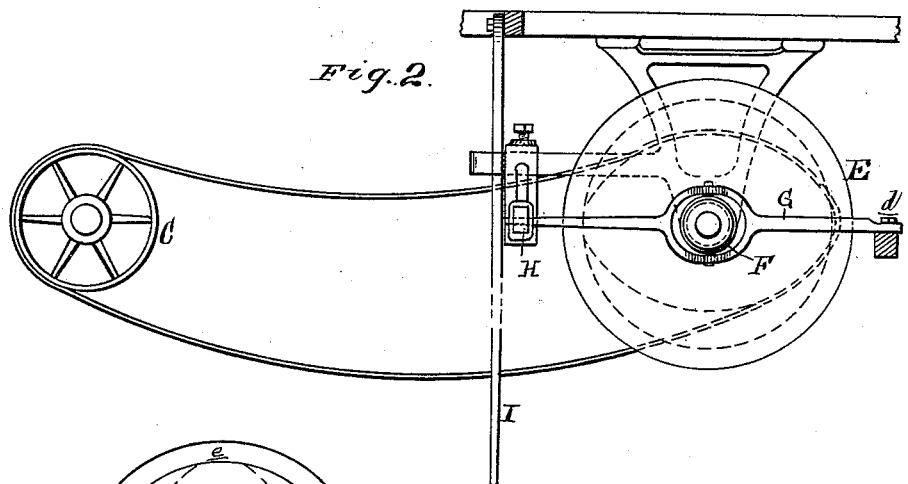
Figure 3:
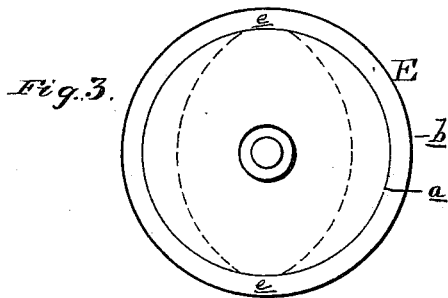
Figure 4:
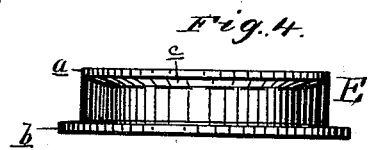

Figure 1 is a plan view of my improved loose pulley as in operation, the belt being in engagement with the two driving-pulleys. Fig. 2 is a side elevation of the same, but having the belt engaged with the loose pulley. Fig. 3 is a face elevation of the loose pulley detached. Fig. 4 is an edge elevation of the same.

In the accompanying drawings, which form a part of this specification, A represents the main shaft, and B the counter-shaft, the latter of which carries a fast pulley C, and upon the former is secured the fast and driving pulley D. These parts are of the ordinary construction and arrangement, and form no part of my present invention, except as they form part of the combination of parts hereinafter set forth.

E represents my improved loose pulley. This pulley is provided with the two flanges $a$ $b$, the former of which, preferably, is of the same diameter as the pulley D, while the latter is somewhat greater in diameter, to prevent the belt from running off upon that side of the pulley. At two diametrically-opposite points on the face of the loose pulley, intermediate between these two flanges $a$ $b$, such face is flush with the periphery of the flange $a$, as at $e$; but the face of the pulley intermediate between these two flush faces is cut away, thus forming on the face of the pulley a groove in the shape of an ellipse, as is fully and clearly shown in dotted lines in Figs. 2 and 3. The inner wall of the flange $a$ connects with the face of the elliptical portion of the pulley upon an incline $c$, as shown in Figs. 1 and 4, and for the purpose hereinafter described.

F is a sleeve upon the shaft A, and with this sleeve there is connected a rod or bar G, one end of which is pivotally connected to a rigid bar or hanger, as at $d$, while its opposite end is pivoted to the shifting-bar H. The latter may be arranged to shift either the upper or lower portion of the belt, as may be desired, through the medium of the shifting-lever I, as in the ordinary manner.

In practice the operation of my improved device is as follows: The belt being in position shown in Fig. 1—that is, engaged with the two actuating-pulleys C D—by properly moving the shifting-bar the belt is forced from the main pulley D upon the loose pulley E, and after this pulley has made a partial revolution the belt will rest upon side of the ellipse, as shown in Fig. 2, and thus motion to the pulley C is arrested. By now moving the shifter in the opposite direction the loose pulley is brought into frictional contact with the fast pulley D, which necessarily imparts a rotary motion to the loose pulley, and as the flush face of the loose pulley comes in contact with the inner face of the belt the latter is raised to the diameter of the driving-pulley, and in the continued rotation of the loose pulley and by the pressure of the shifter the belt gradually climbs up the inclined face of the flange $a$ until it reaches the flush face of the pulley at $e$, when it engages with the drive-pulley D. By this construction and arrangement of parts it will readily be seen that when the belt is engaged with the loose pulley all danger of its accidentally running upon the fast pulley is obviated, as the loose pulley must be put in motion before the belt can possibly shift its position. It will also be seen that while the belt is resting upon the loose pulley there is a slack in the belt which allows the belt to shrink or contract, and thus partially take up the "stretch" or elongation of the belt which necessarily followed after being in operation upon the driving-pulleys. Hence the belt will wear a much longer time than when it is merely shifted from a drive-pulley to a loose pulley of the same diameter, and where the strain is continually kept upon the belt.

What I claim as my invention is—

1. A loose pulley having an elliptical face, an annular flange upon one side which is flush with the face of the pulley on the longest diameter of the ellipse, said flange being approximately of the same circumference as the driving-pulley with which the loose pulley is mated, and a flange on the opposite face of the loose pulley, substantially as described.

2. The combination of a loose pulley, having an elliptical face and flanges, with the driving-shaft and a fast pulley, said loose pulley being mounted upon the driving-shaft and adapted to be thrown into contact with the fast pulley, substantially as shown and described.

3. The combination of a loose pulley, having an elliptical face and flanges, with a drive-pulley, a belt-shifter, and a swinging arm attached to said belt-shifter and adapted to force the loose pulley into frictional contact with the driving-pulley, substantially as specified.

In testimony whereof I affix my signature, in presence of two witnesses, this 29th day of October, 1889.

ORIEN B. MARTIN.

Witnesses:
 THOMAS HALE,
 JOS. A. OSBORNE.